United States Patent
Shimanuki et al.

(10) Patent No.: US 6,945,488 B2
(45) Date of Patent: Sep. 20, 2005

(54) MAGNETIC TAPE DRIVE APPARATUS

(75) Inventors: Hiroyuki Shimanuki, Yamagata (JP); Takeshi Suzuki, Yamagata (JP); Kenichi Ojima, Yamagata (JP); Atsushi Tanaka, Yamagata (JP)

(73) Assignee: NEC Corporation, Tokyo (JP)

( * ) Notice: Subject to any disclaimer, the term of this patent is extended or adjusted under 35 U.S.C. 154(b) by 55 days.

(21) Appl. No.: 10/271,948

(22) Filed: Oct. 17, 2002

(65) Prior Publication Data

US 2003/0075633 A1 Apr. 24, 2003

(30) Foreign Application Priority Data

Oct. 18, 2001 (JP) ........................................ 2001-320681

(51) Int. Cl.[7] .............................................. G11B 15/67
(52) U.S. Cl. ..................................... 242/332.4; 360/95
(58) Field of Search .............................. 242/332.4, 338; 360/95, 128

(56) References Cited

U.S. PATENT DOCUMENTS

| | | | | |
|---|---|---|---|---|
| 6,034,839 A | * | 3/2000 | Hamming | 360/95 |
| 6,067,211 A | * | 5/2000 | Chliwnyj et al. | 360/128 |
| 6,208,488 B1 | * | 3/2001 | Yamakawa et al. | 360/128 |
| 6,359,751 B1 | * | 3/2002 | Groel et al. | 360/128 |
| 6,433,961 B1 | * | 8/2002 | Tsuchiya et al. | 360/128 |
| 6,437,938 B1 | * | 8/2002 | Wada | 360/95 |
| 6,621,656 B2 | * | 9/2003 | Underkofler et al. | 360/95 |
| 6,678,118 B2 | * | 1/2004 | Tanaka et al. | 360/128 |
| 2003/0015615 A1 | | 1/2003 | Shimanuki | |

FOREIGN PATENT DOCUMENTS

| | | |
|---|---|---|
| JP | H07-078389 | 3/1995 |
| JP | 2001-184851 A | 7/2001 |
| JP | 2001-217079 | 7/2001 |
| JP | 2002-133618 A | 5/2002 |
| JP | 2002-298472 A | 10/2002 |

* cited by examiner

Primary Examiner—Kathy Matecki
Assistant Examiner—Sang Kim
(74) Attorney, Agent, or Firm—Sughrue Mion, PLLC

(57) ABSTRACT

Deck mechanism assembly comprises deck base, head guide assembly which is disposed on the deck base and which reads and writes data from/to a magnetic tape, cartridge reel motor which drives a reel on which the magnetic tape is wound, clutch which transmits a drive force of the cartridge reel motor to the reel enclosed in the cartridge, loader which conveys the loaded cartridge and mounts the cartridge in the state of the magnetic tape being able to be pulled out, loader motor which drives the loader, threader which pulls out a leader block placed at an edge portion of the magnetic tape and conveys the leader block, and head brush mechanism which functions corresponding to the leader block which is conveyed. Since the loader motor is disposed in the rear of the loader on the deck base, the width of apparatus can be decreased.

6 Claims, 15 Drawing Sheets

[OUTLINED STRUCTURE OF DECK MECHANISM ASSEMBLY PORTION OF MAGNETIC TAPE DRIVE APPARATUS]

[APPEARANCE OF MAGNETIC TAPE DRIVE APPARATUS]

FRONT OF APPARATUS
(CARTRIDGE LOADING SIDE)

[OUTLINED STRUCTURE OF MAGNETIC TAPE DRIVE APPARATUS]

[OUTLINED STRUCTURE OF DECK MECHANISM ASSEMBLY PORTION OF MAGNETIC TAPE DRIVE APPARATUS]

[LOADER PORTION OF MAGNETIC TAPE DRIVE APPARATUS]

CARTRIDGE LOADING DIRECTION

[MECHANICAL STRUCTURE OF LOADER PORTION OF MAGNETIC TAPE DRIVE APPARATUS]

[POSITION OF LOADER PORTION ON DECK BASE OF MAGNETIC TAPE DRIVE APPARATUS]

[STRUCTURE OF THREADER PORTION OF MAGNETIC TAPE DRIVE APPARATUS]

[OPERATION OF THREADER ARM OF THREADER PORTION OF MAGNETIC TAPE DRIVE APPARATUS]

[STRUCTURE OF HEAD GUIDE
ASSEMBLY PORTION OF MAGNETIC
TAPE DRIVE APPARATUS]

[UPPER PERSPECTIVE VIEW OF HEAD BRUSH MECHANISM OF MAGNETIC TAPE DRIVE APPARATUS]

[LOWER PERSPECTIVE VIEW OF HEAD BRUSH MECHANISM OF MAGNETIC TAPE DRIVE APPARATUS]

CARTRIDGE 81 OPERATION DIRECTION OF LOADER TRAY 19  4

ELASTIC FORCE  19

[CARTRIDGE CONVEYING OPERATION IN LOADER OF MAGNETIC TAPE DRIVE APPARATUS]

CARTRIDGE 121 52 122

[STATE OF MAGNETIC TAPE DRIVE
APPARATUS HAS CONVEYED CARTRIDGE
OR NOT UNLOADED CARTRIDGE BY LOADER]

CARTRIDGE   LEADER BLOCK
MAGNETIC TAPE

[STATE OF MAGNETIC TAPE DRIVE
APPARATUS PULLED OUT
MAGNETIC TAPE BY THREADER]

[POSITION OF BRUSH ARM IN THE STATE OF MAGNETIC TAPE DRIVE APPARATUS HAS CONVEYED LEADER BLOCK BY THREADER]

[STATE OF MAGNETIC TAPE DRIVE APPARATUS IS RUNNING TAPE]

[STATE OF MAGNETIC TAPE DRIVE APPARATUS HAS UNLOADED CARTRIDGE BY LOADER OR HAS LOADED CARTRIDGE MANUALLY OR BY HANDLING MECHANISM]

[POSITION OF THREADER IN THE STATE OF MAGNETIC TAPE DRIVE APPARATUS HAS NOT LOADED CARTRIDGE FOR PREDETERMINED TIME PERIOD]

FIG.19A
CARTRIDGE LOADING DIRECTION
FIG.19B
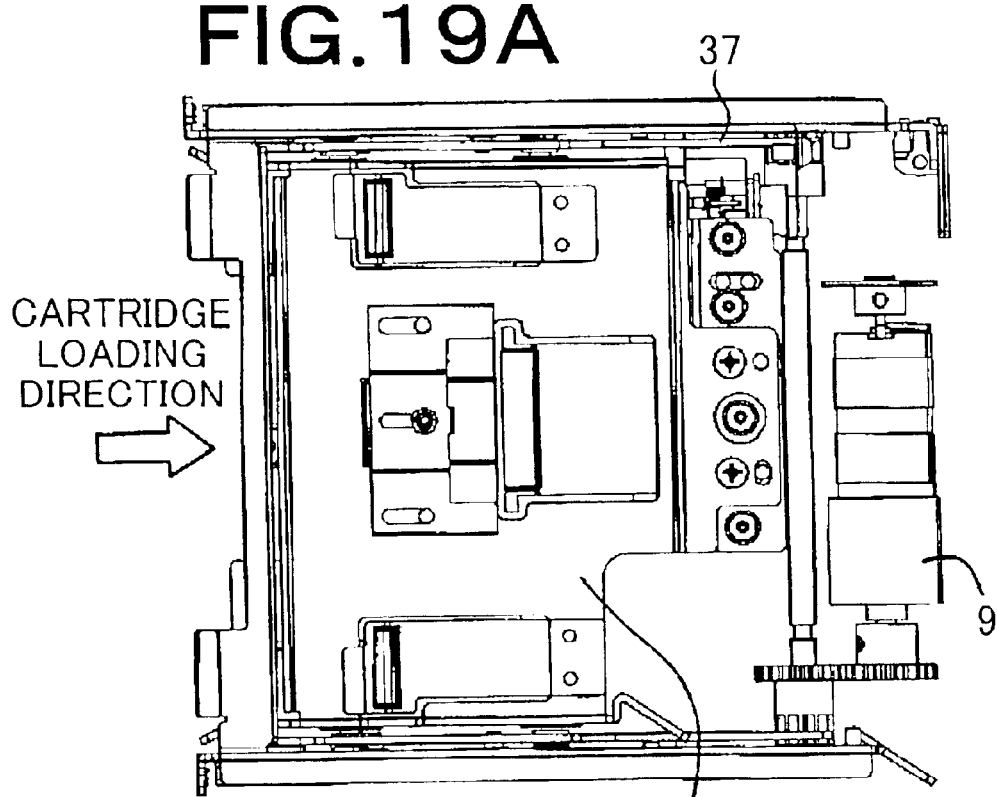
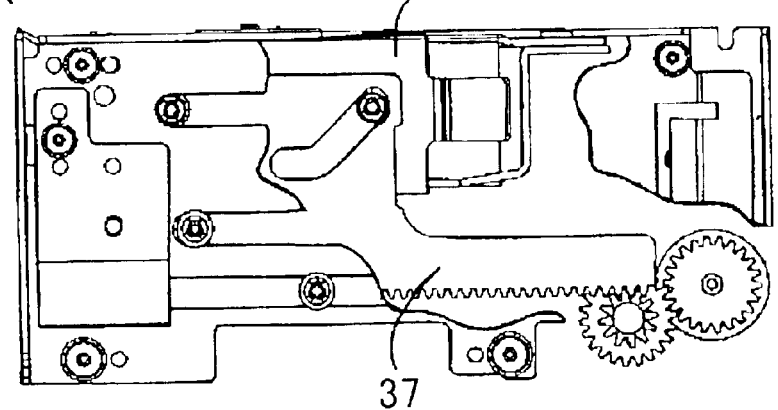
[MECHANICAL STRUCTURE OF LOADER PORTION OF MAGNETIC TAPE DRIVE APPARATUS ACCORDING TO ANOTHER EMBODIMENT]

MAGNETIC TAPE DRIVE APPARATUS

BACKGROUND OF THE INVENTION

1. Field of the Invention

The present invention relates to a magnetic tape drive apparatus using a ½-inch CGMT (Cartridge Magnetic Tape).

2. Description of the Related Art

Conventionally, in a computer system that processes a company's main job, to assure data recorded on a hard disk, the data is periodically backed up to a magnetic tape apparatus.

However, since a magnetic tape drive mounted on a magnetic tape apparatus for a high-end user is large, the magnetic tape apparatus tends to become large. Thus, it is necessary to reduce the size of the drive. In a conventional drive, a motor is disposed across a loader. Thus, the width of the drive becomes large. In addition, a threader mechanism that pulls out a magnetic tape from a cartridge uses a link mechanism with which a threader arm is articulated and its complicated locus is traced by a part of a threader arm.

In addition, in the loader mechanism of the conventional magnetic tape drive apparatus, after the loader has conveyed the cartridge, while the tape is running, although the loader is vibrated, that does not affect the positioning control of the mechanism of the apparatus. However, when the size of the apparatus is decreased or the data record density of a magnetic tape is increased, since the mechanism of the apparatus becomes precise, the positioning control should be precisely performed. In this case, the vibration of the loader prevents the positioning control from being precisely performed. Thus, it is necessary to remove play between a loader tray and other parts. Moreover, a conventional head brush mechanism sometimes vibrates while a magnetic tape is running. Thus, it is necessary to remove play between the loader tray and other parts including the brush arm.

SUMMARY OF THE INVENTION

Therefore, an object of the present invention is to provide a magnetic tape drive apparatus using a ½-inch CGMT and that has a small and simplified structure with a reduced number of parts.

To solve the forgoing object, the present invention is provided a magnetic tape drive apparatus which magnetically records and reproduces data using a tape cartridge which encloses a magnetic tape, comprising a loader which conveys a loaded tape cartridge and mounts the tape cartridge in a state of the magnetic tape being able to be pulled out, a loader motor which drives the loader, a threader which pulls out a leader block placed at an edge portion of the magnetic tape from the mounted cartridge and conveys the leader block, and a head brush mechanism which functions corresponding to the leader block conveyed by the threader, wherein the loader motor is disposed in the rear of the loader. The threader has one threader arm which circles about its fulcrum.

With the forgoing structure, the width of the drive can be decreased and the mechanism can be simplified.

These and other objects, features and advantages of the present invention will become more apparent in light of the following detailed description of preferred embodiments thereof, as illustrated in the accompanying drawings.

BRIEF DESCRIPTION OF DRAWINGS

FIGS. 19A and 19B are a top view and a side view showing the mechanical structure of a loader portion of a magnetic tape drive apparatus according to another embodiment of the present invention.

DESCRIPTION OF PREFERRED EMBODIMENTS

Next, with reference to the accompanying drawings, embodiments of the present invention will be described.

Figure 1:
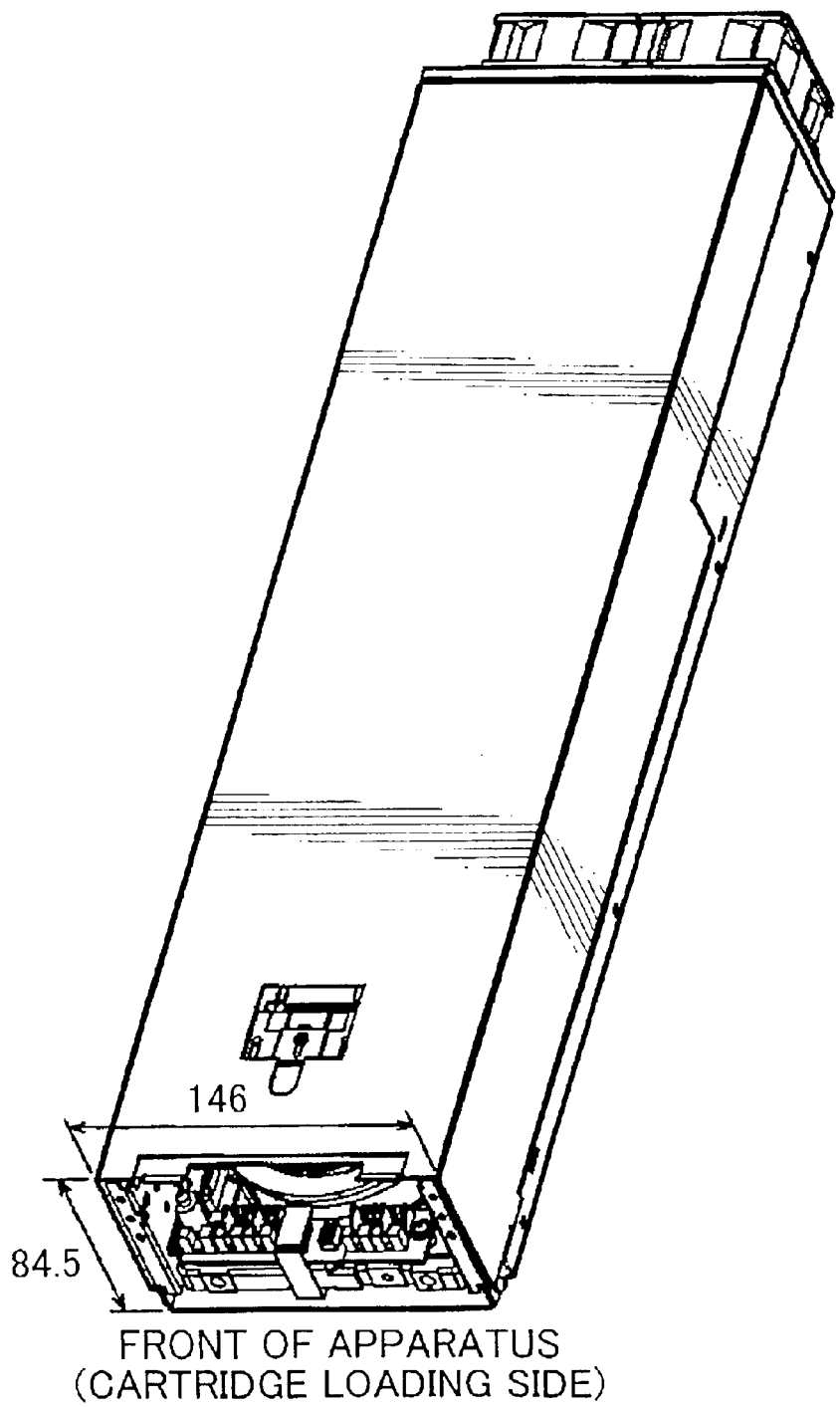
FIG. 1 is an external view showing a magnetic tape drive apparatus according to the present invention.

FIG. 1 shows an appearance of a magnetic tape drive apparatus according to the present invention. The aperture size on the front (cartridge loading side) of the magnetic tape drive apparatus using a ½-inch CGMT matches 5-inch form factor size. Since the aperture size of the magnetic tape drive apparatus is the same as the width of a 5-inch unit such as a CD-ROM unit mounted on a desk top computer, the magnetic tape drive apparatus according to the present invention can be mounted on a computer unit such as a workstation or a server corresponding to the form factor standard.

Figure 2:
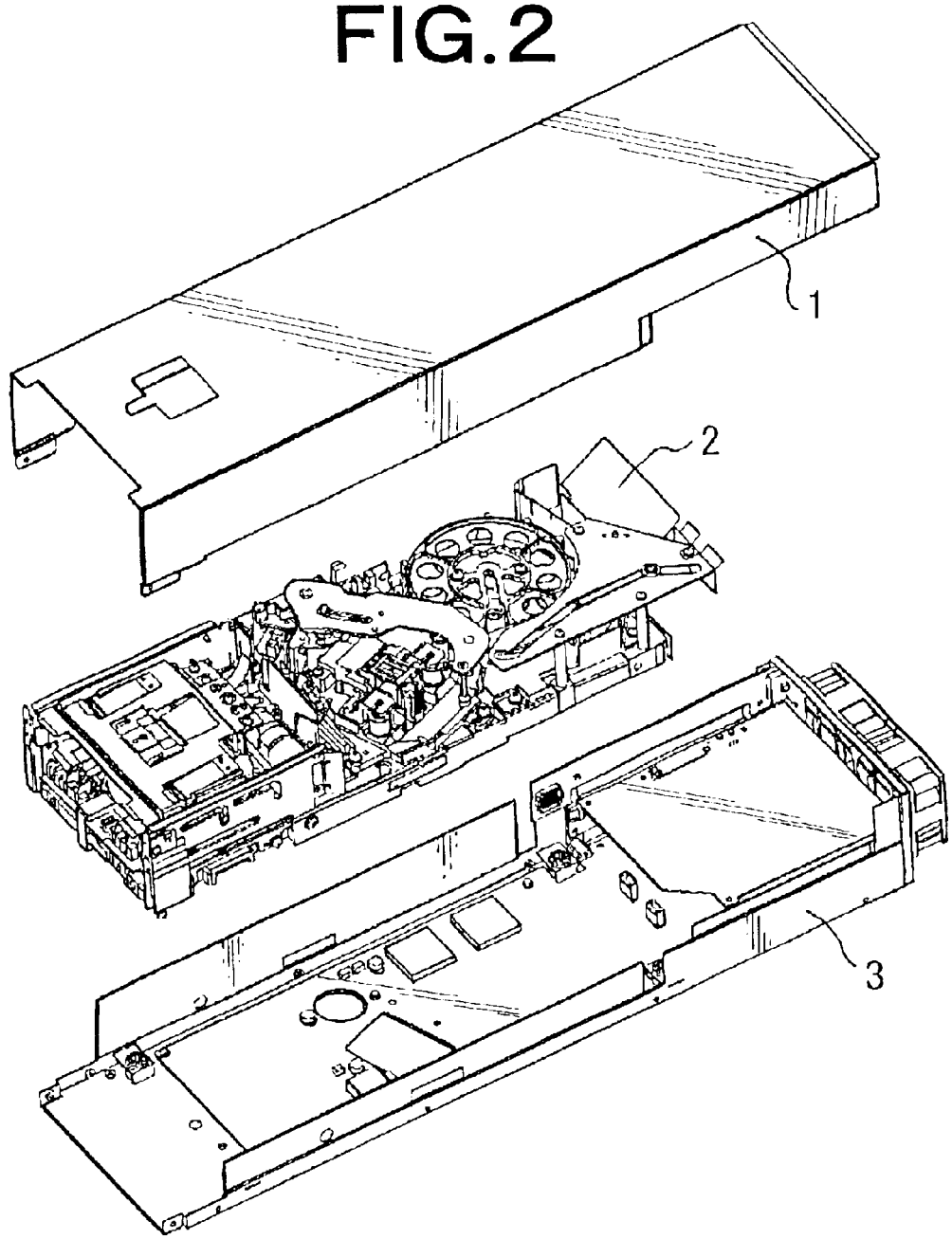
FIG. 2 is an exploded perspective view showing the outlined structure of the magnetic tape drive apparatus according to the present invention.

FIG. 2 shows an outlined structure of the magnetic tape drive apparatus according to the present invention. The magnetic tape drive apparatus mainly comprises a top cover 1, a deck mechanism assembly 2, and a bottom cover assembly 3. The bottom cover assembly 3 is composed of a bottom cover, an electric circuit board, and a cooling fan. The magnetic tape drive apparatus is mounted on a host unit through the bottom cover assembly 3.

Figure 3:
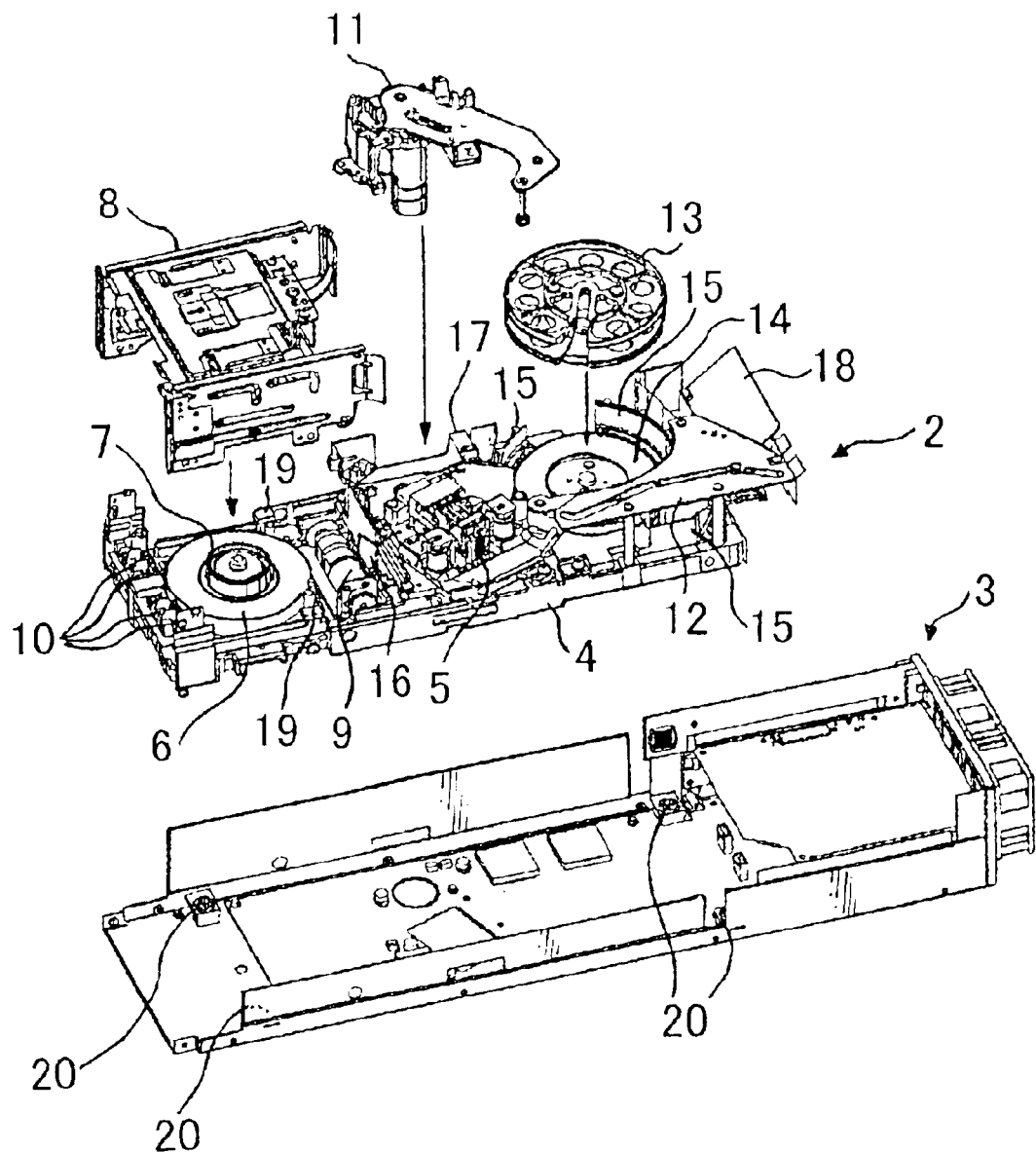
FIG. 3 is an exploded perspective view showing the outlined structure of a deck mechanism assembly portion of the magnetic tape drive apparatus according to the present invention.

FIG. 3 shows an outlined structure of the deck mechanism assembly portion of the magnetic tape drive apparatus according to the present invention. The deck mechanism assembly 2 is composed of a deck base 4, a head guide assembly 5, a cartridge reel motor 6, a clutch 7, a loader 8, a loader motor 9, a cartridge ID sensor 10, a threader 11, a head brush mechanism 12, a take-up reel 13, a take-up reel motor 14, a tape tray 15, a motor drive circuit board 16, a deck FPC (Flexible Printed Circuit) 17, an air baffle 18, and a rubber elastic member 19. The head guide assembly 5 is disposed on the deck base 4. The head guide assembly 5 reads and writes data from and to a magnetic tape. The cartridge reel motor 6 drives a reel, on which the magnetic tape is wound and enclosed in a magnetic tape cartridge. The clutch 7 transfers a drive force of the cartridge reel motor 6 to a reel enclosed in the cartridge. The loader 8 conveys the cartridge loaded to the drive apparatus and mounts the cartridge so that the reel enclosed in the cartridge is engaged with the clutch 7 and the magnetic tape can be pulled out. The loader motor 9 drives the loader 8. The cartridge ID sensor 10 identifies the type of the mounted cartridge. The threader 11 pulls out a leader block placed at an edge portion of the magnetic tape from the mounted cartridge and conveys the leader block. The head brush mechanism 12 functions in association with a operation of the threader 11 to convey the leader block. The take-up reel 13 winds up the tape pulled out by the threader 11. The take-up reel motor 14 drives the take-up reel 13. The tape tray 15 is disposed around the take-up reel motor 14. The tape tray 15 prevents the tape from largely deviating from the reel when the tape wound on the reel becomes loose due to an operation error. The motor drive circuit board 16 drives motors for the loader 8 and the threader 11. The deck FPC 17 connects sensors of the deck base 4, the head guide assembly 5, the loader 8, and the threader 11, the cartridge reel motor 6, the take-up reel motor 14, the motor drive circuit board 16, and the electric circuit board that is disposed on the bottom cover assembly 3 and that controls those parts. The air baffle 18 is disposed at an upper portion of the deck mechanism assembly 2. The air baffle 18 prevents an air flow of the cooling fan from taking place from a view point of dust protection. The rubber elastic member 19 prevents the mechanical parts that compose the loader 8 from vibrating. To prevent the deck base 4 from vibrating, the deck base 4 is disposed on the bottom cover assembly 3 through a rubber buffering member 20.

Figure 4:
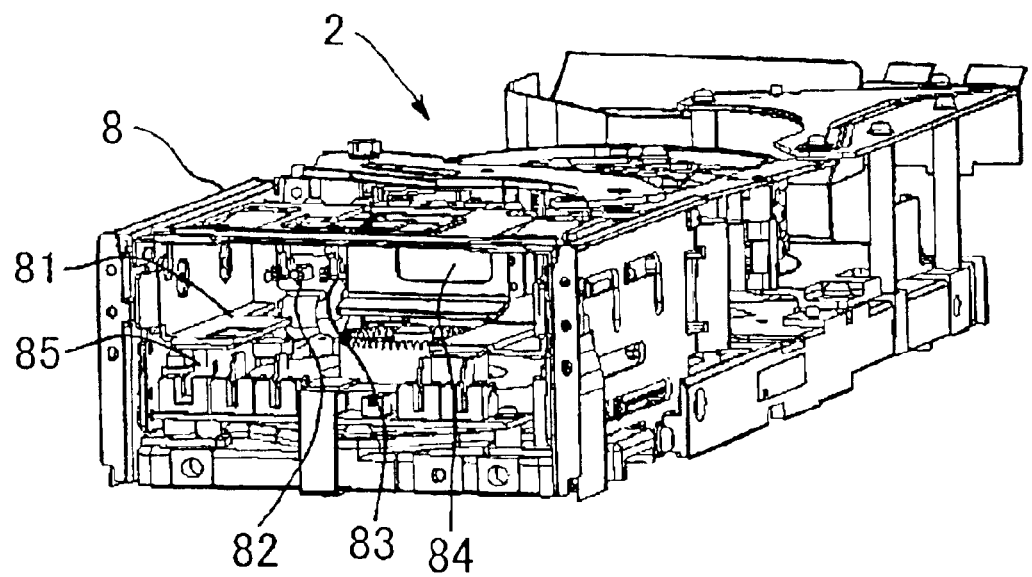
FIG. 4 is a perspective view showing a loader portion of the magnetic tape drive apparatus according to the present invention.

FIG. 4 shows the structure of the loader portion of the magnetic tape drive apparatus according to the present invention. The loader portion is composed of a loader tray 81, photo sensors 82 and 83, a cartridge memory sensor 84, and a flag 85. The loader tray 81 conveys the cartridge. In the rear of the loader tray 81, the photo sensor 82 is disposed. The photo sensor 82 detects whether or not the cartridge has been fully loaded to the loader tray 81. The photo sensor 83 detects whether or not data can be written to the cartridge loaded to the loader tray 81. The cartridge memory sensor 84 reads a radio wave of the content of an IC memory built in the cartridge. The flag 85 is placed on the loader tray 81.

Figure 5A:
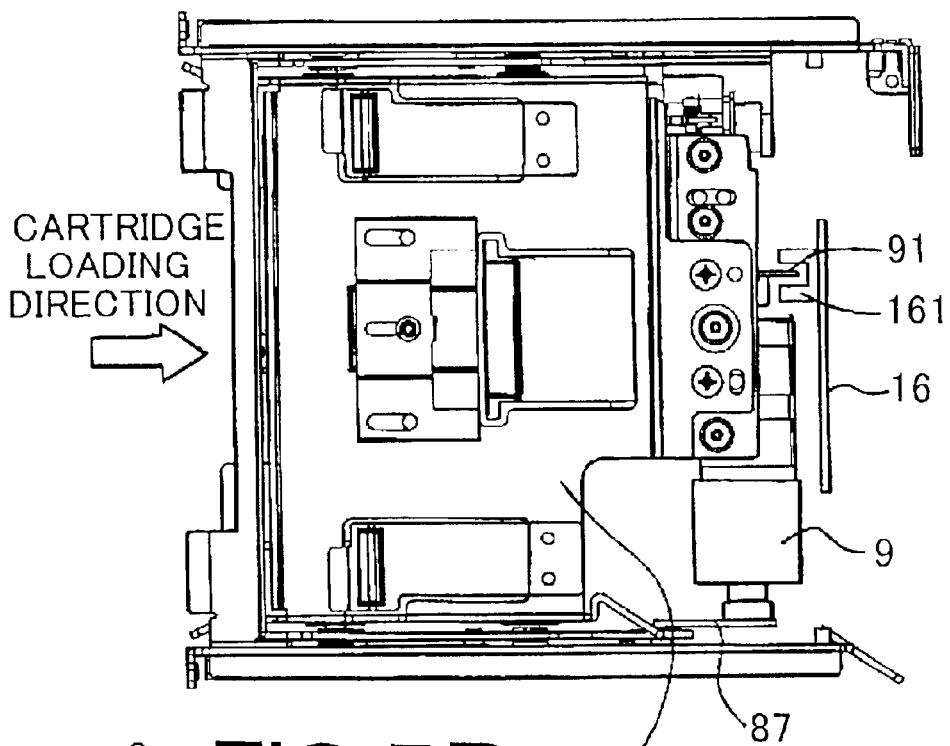
FIGS. 5A and 5B are a plan view and a side view showing the mechanical structure of the loader portion of the magnetic tape drive apparatus according to the present invention, respectively.
Figure 5B:
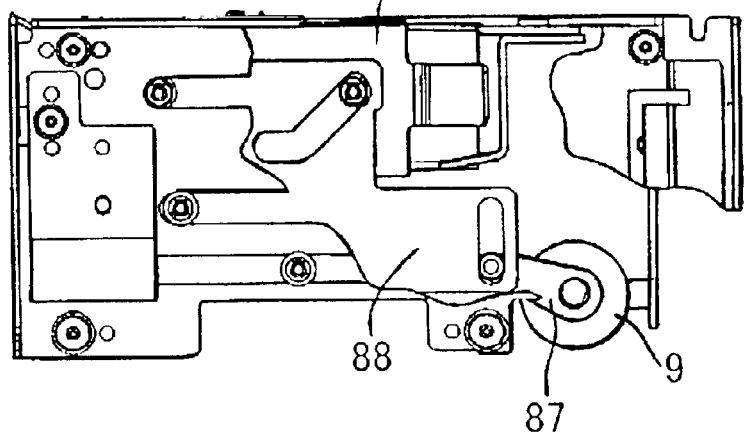

FIGS. 5A and 5B show the mechanical structure of the loader portion of the magnetic tape drive apparatus according to the present invention. In the loader 8, the loader motor 9 rotates a drive arm 87. A rotation converting mechanism converts the rotation of the drive arm 87 into a forward and backward motion of a loader cam plate 88. Corresponding to the motion of the loader cam plate 88, the loader tray 81 travels. A flag 91 is placed at a rotating shaft of the loader motor 9. The flag 91 is detected by a photo sensor 161 disposed on the motor drive circuit board 16. Corresponding to the detected flag 91, the speed of rotation of the loader motor 9 is measured.

Figure 6:
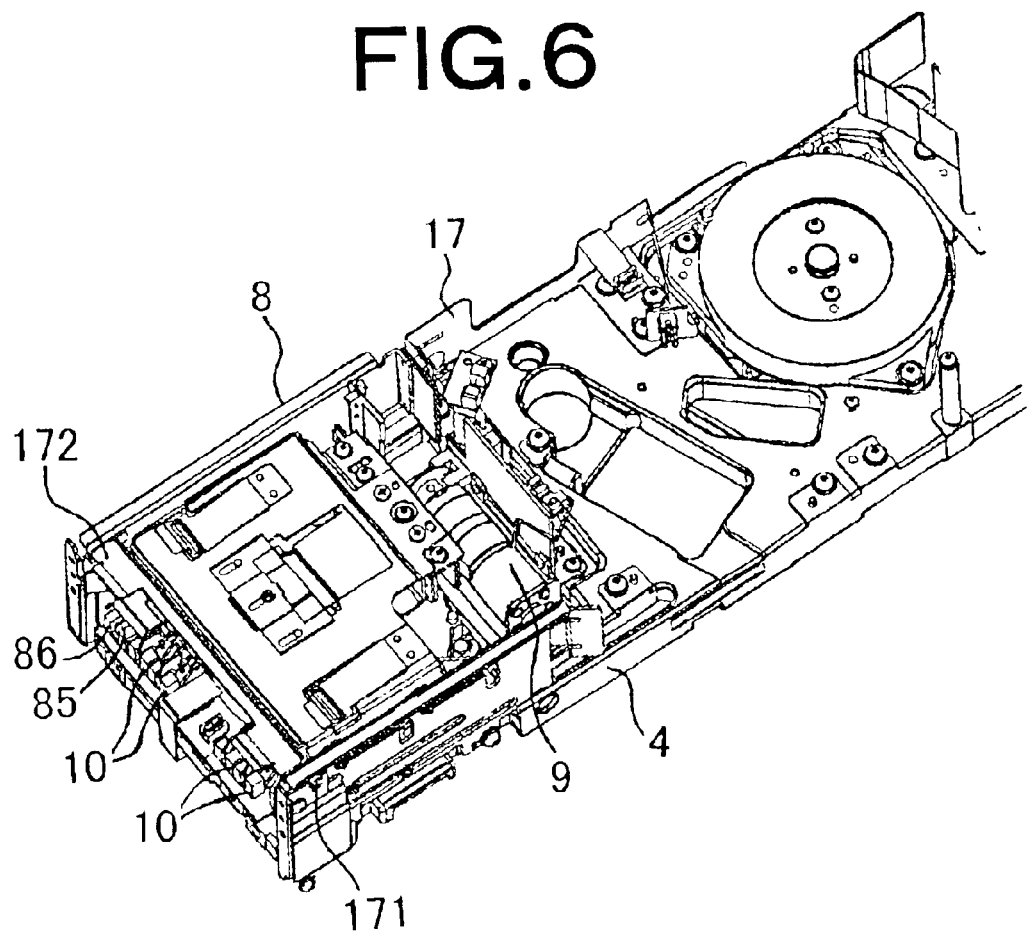
FIG. 6 is a perspective view showing the position of the loader portion on a deck base of the magnetic tape drive apparatus according to the present invention.

FIG. 6 shows the position of the loader portion on the deck base of the magnetic tape drive apparatus according to the present invention. When the loader 8 and the deck FPC 17 are mounted on the deck base 4, a photo diode 171 and a photo transistor 172 of the deck FPC 17 are oppositely disposed with the loader 8. Light emitted from the photo diode 171 is detected by the photo transistor 172. Thus, when a cartridge is present in the loader tray 81, it blocks the light. As a result, the cartridge is detected. Since the loader motor 9 is disposed in the rear of the loader 8 of the deck base 4, the width of the apparatus can be decreased.

A photo sensor 86 is disposed across the cartridge ID sensor 10 of the deck base 4. When the loader tray 81 is placed at a cartridge unload position, the photo sensor 86 detects the flag 85 placed on the loader tray 81. The cartridge is conveyed by the loader 8. Thereafter, the reel on which the magnetic tape is wound and that is enclosed in the cartridge is engaged with the clutch 7. In this state, the magnetic tape can be pulled out. This state is referred to as mount state. In the mount state, the cartridge ID sensor 10 identifies the cartridge. With the signal of the photo sensor 161, the speed of rotation of the loader motor 9 is controlled. With the output signals of the photo sensor 86 and the cartridge ID sensor 10, the operation speed and the stop timing of the loader motor 9 are controlled.

Figure 7:
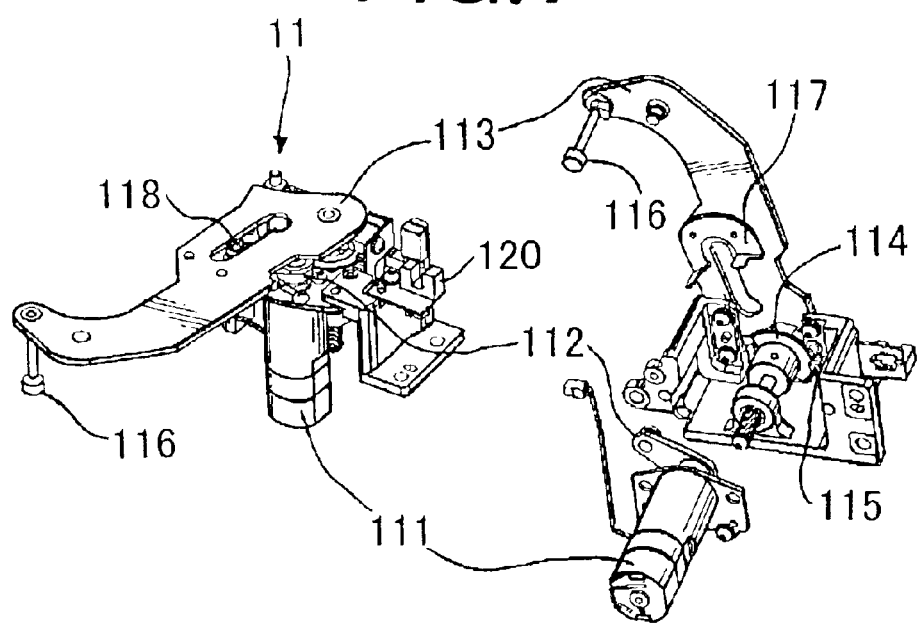
FIG. 7 is an exploded view showing the structure of a threader portion of the magnetic tape drive apparatus according to the present invention.

FIG. 7 shows the structure of the threader portion of the magnetic tape drive apparatus according to the present invention. When a thread motor 111 of the threader 11 is driven, a drive arm 112 disposed at a rotating shaft thereof is rotated. When the drive arm 112 is rotated, a threader arm 113 is driven. A slit disc 114 is disposed at a rotating shaft of the threader arm 113. A rotation of the threader arm 113 is detected by a photo sensor 115. A threader pin 116 and a flag 117 are placed on the threader arm 113. The leader block at the edge of the magnetic tape enclosed in the cartridge is hooked to the threader pin 116. For a maintenance work, a hexagonal hold is formed in a boss 118 at the edge of the drive arm 112. When a hexagonal wrench is inserted into the hexagonal hole and the boss 118 is rotated by the hexagonal wrench, the rotating shaft of the thread motor 111 is rotated. Thus, without need to supply power to the thread motor 111, the threader arm 113 can be manually operated.

Figure 8A:
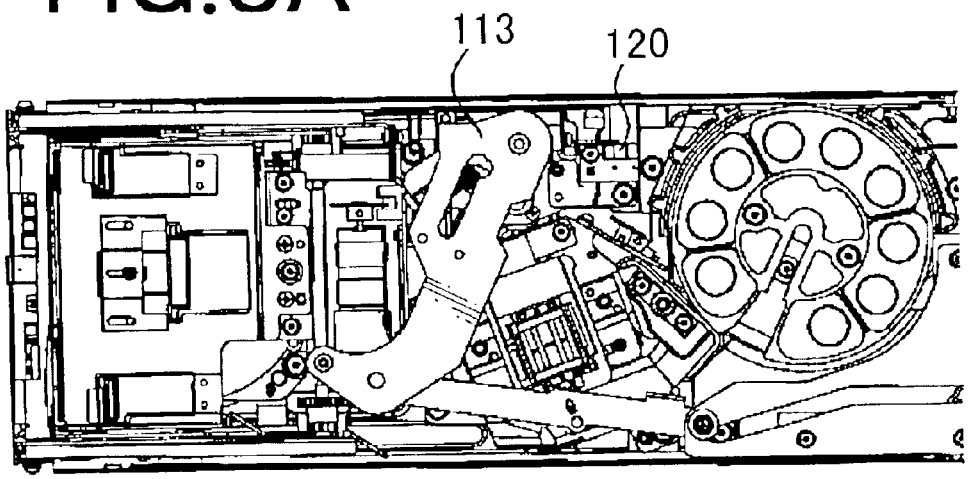
FIGS. 8A and 8B are plan views showing an operation of a threader arm of the threader portion of the magnetic tape drive apparatus according to the present invention.
Figure 8B:
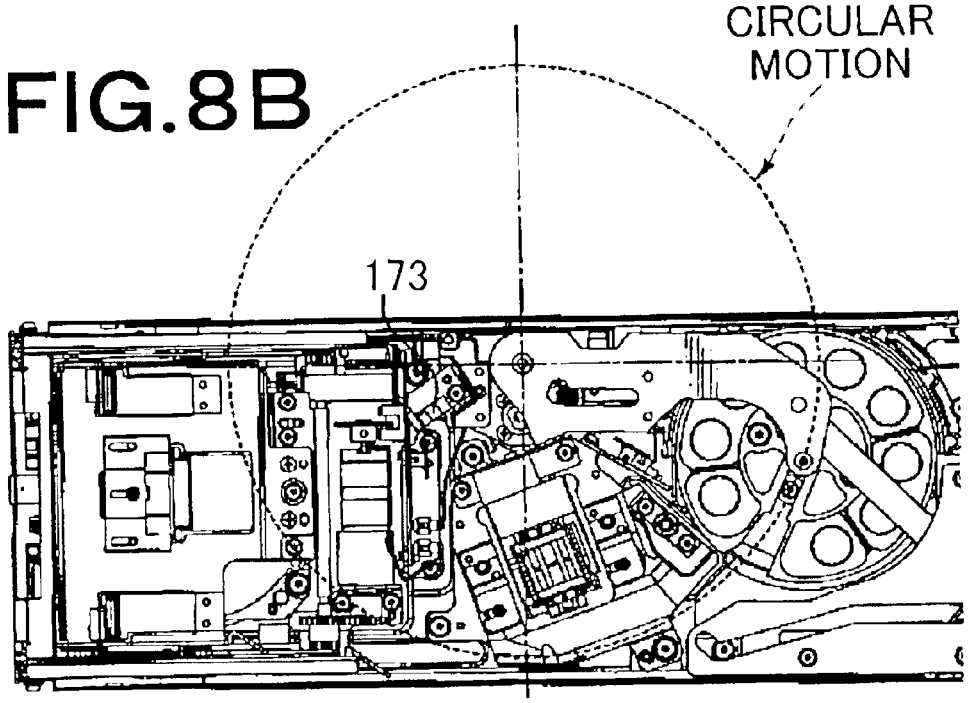

FIGS. 8A and 8B are top views showing the operation of the threader arm of the threader portion of the magnetic tape drive apparatus according to the present invention. The threader arm 113 does not use an articulated link mechanism that traces a complicated locus. Instead, the threader arm 113 circularly moves about its fulcrum. To detect the flag 117 placed on the threader arm 113 shown in FIG. 7, in the moving range of the threader arm 113, a photo sensor B120 is disposed in the vicinity of the take-up reel 13. In addition, in the moving range of the threader arm 113, a photo sensor A173 of the deck FPC 17 is disposed in the vicinity of the loader 8. Corresponding to output signals of the photo sensor A173 and the photo sensor B120 and an output signal of the photo sensor 115 shown in FIG. 7 for the rotation speed of the threader arm 113, the operation speed and the stop timing of the thread motor 111 are controlled.

Figure 9:
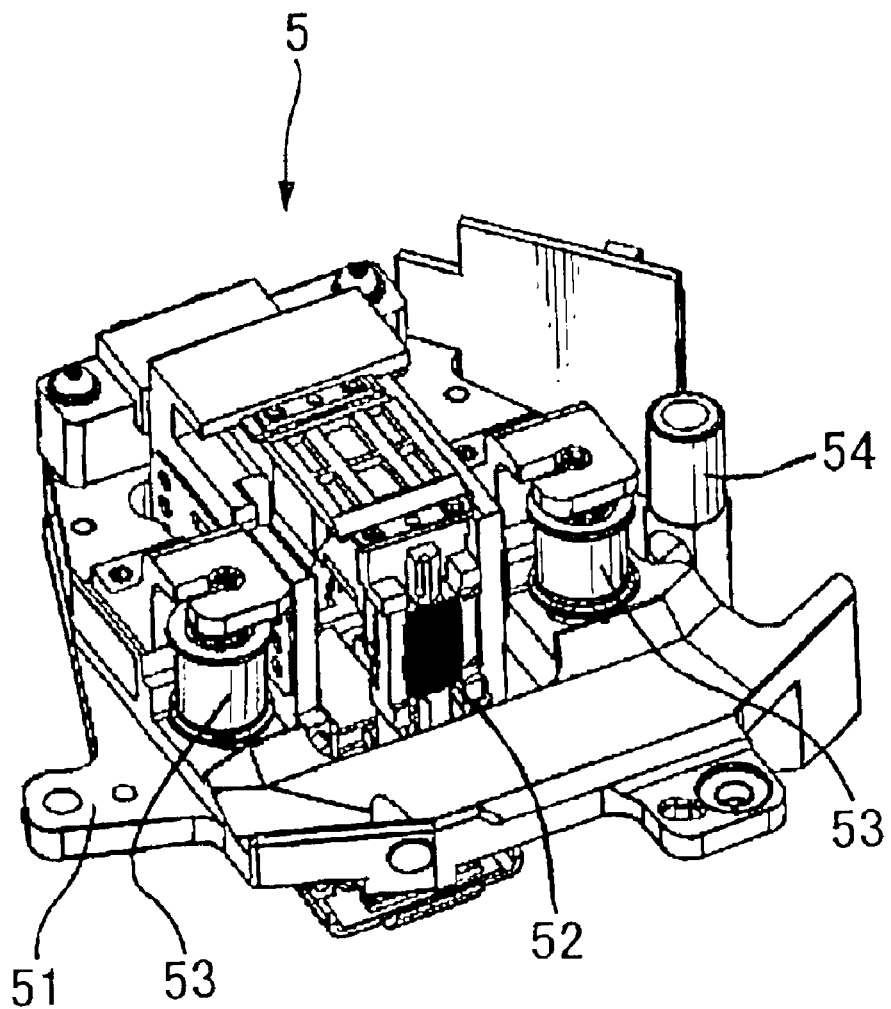
FIG. 9 is a perspective view showing the structure of a head guide assembly portion of the magnetic tape drive apparatus according to the present invention.

FIG. 9 shows the structure of the head guide assembly portion of the magnetic tape drive apparatus according to the present invention. The head guide assembly 5 is composed of a head base 51, a head assembly 52, guide rollers 53, and a tension transducer 54. The head assembly 52 reads and writes data from/to the magnetic tape. The guide rollers 53 are oppositely disposed with the head assembly 52. The tension transducer 54 is disposed outside one of the guide rollers 53. The tape contacts the tension transducer 54. The tension of the tape causes the tension transducer 54 to have a distortion. The tension transducer 54 converts the distortion into an electric signal and outputs the electric signal. Corresponding to the electric signal, the tension of the tape that is running is controlled.

Figure 10:
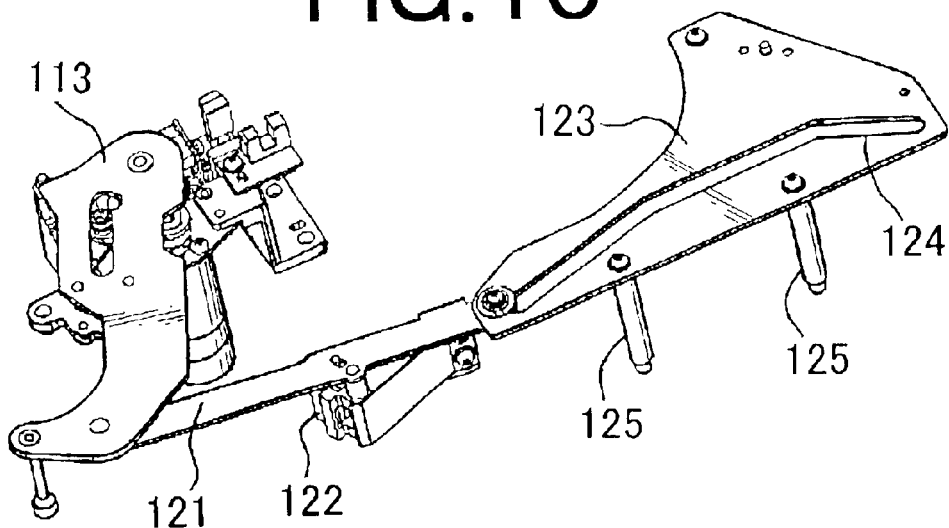
FIG. 10 is an upper perspective view showing a head brush mechanism of the magnetic tape drive apparatus according to the present invention.

FIG. 10 is an upper perspective view showing the head brush mechanism of the magnetic tape drive apparatus according to the present invention. The head brush mechanism 12 is composed of a brush arm 121, a brush 122, and a brush cam plate 123. The brush arm 121 is connected to the threader arm 113. The brush 122 is disposed on the brush arm 121. The brush cam plate 123 guides the other end of the brush arm 121. When the threader arm 113 travels, the brush arm 121 travels along a guide groove 124 of the brush cam plate 123. The brush cam plate 123 is disposed on the deck base 4 through posts 125.

Figure 11:
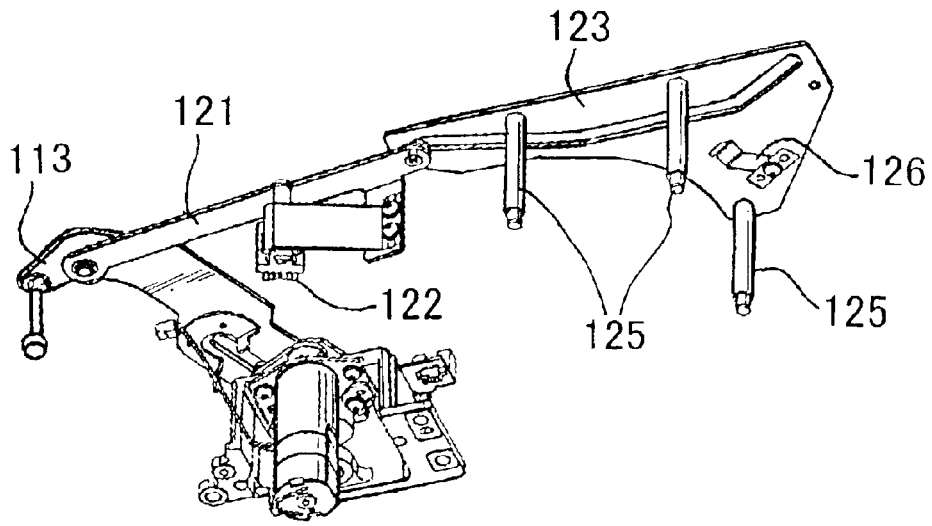
FIG. 11 is a lower perspective view showing the head brush mechanism of the magnetic tape drive apparatus according to the present invention.

FIG. 11 is a lower perspective view showing the head brush mechanism of the magnetic tape drive apparatus according to the present invention. A leaf spring 126 is disposed on the brush cam plate 123 so that the leaf spring 126 operates while the tape is running. While the magnetic tape is running, the elastic force of the leaf spring 126 causes the brush arm 121 to raise so as to remove play between parts of the head brush mechanism 12 and prevent them from vibrating.

Next, the operation of the magnetic tape drive apparatus according to the present invention will be described. A cartridge is loaded manually or by the handling mechanism of the host unit to the drive in the state of the loader tray 81 of the loader 8 shown in FIG. 4 being placed at the cartridge unloading position. The loaded cartridge blocks light emitted from the photo diode 171 shown in FIG. 6. As a result, the photo transistor 172 detects the presence of the cartridge. When the cartridge is fully loaded to the loader tray 81, the photo sensor 82 shown in FIG. 4 detects that the cartridge is fully loaded.

Figure 12A:
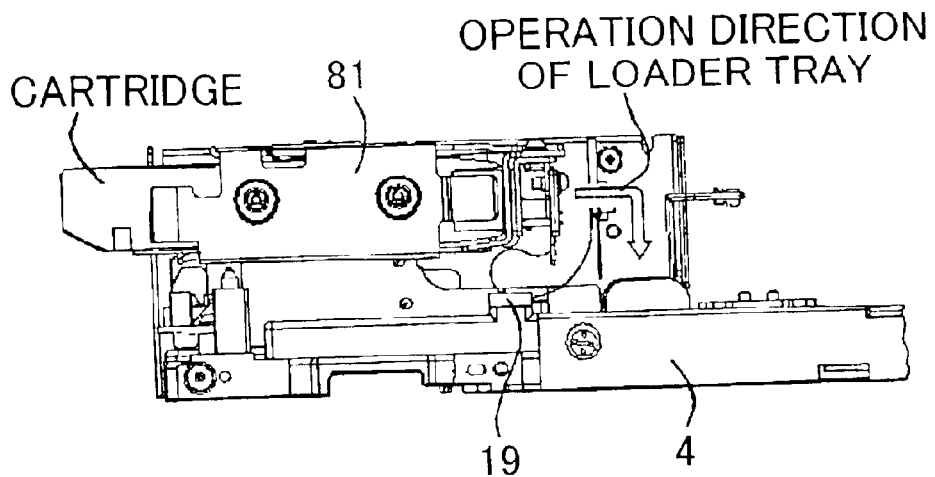
FIGS. 12A and 12B are side views showing a cartridge conveying operation in the loader of the magnetic tape drive apparatus according to the present invention.
Figure 12A:
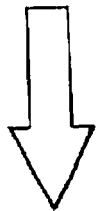
Figure 12B:
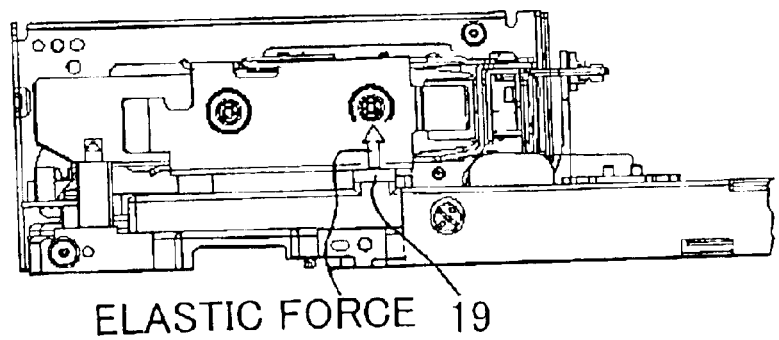

Thereafter, the loader motor 9 shown in FIG. 6 rotates. The drive arm 87 shown in FIGS. 5A and 5B rotates. Thus, the loader cam plate 88 travels backward. When the loader cam plate 88 travels, as shown in FIGS. 12A and 12B, the cam mechanism causes the loader tray 81 and the cartridge placed thereon to be conveyed. The reel enclosed in the cartridge is engaged with the clutch 7 shown in FIG. 3 and the cartridge is placed at a position that allows the magnetic tape to be pulled out. In this state, the loader tray 81 presses the elastic member 19 on the deck base 4. The elastic force of the elastic member 19 causes the loader tray 81 to rise. As a result, play between the parts that compose the loader 8 is removed. After the cartridge is mounted, the cartridge ID sensor 10 shown in FIG. 6 identifies the type of the cartridge. The photo sensor 83 shown in FIG. 4 determines whether or not data can be written to the cartridge. The cartridge memory sensor 84 reads a radio wave of the content of the IC memory build in the cartridge. The operation of the apparatus is completed in the state shown in FIG. 13. When the cartridge is conveyed by the operation of the loader 8, the leader block placed at the edge of the magnetic tape enclosed in the cartridge is hooked to the threader pin 116 placed at the threader arm 113 shown in FIG. 7.

Figure 14:
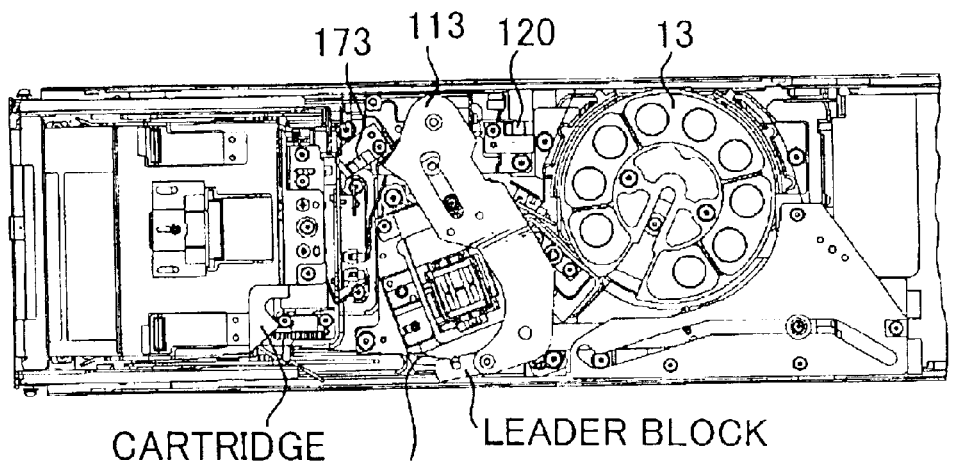
FIG. 14 is a top view showing the state of the magnetic tape drive apparatus pulled out a magnetic tape by the threader of the magnetic tape drive apparatus according to the present invention.
Figure 15:
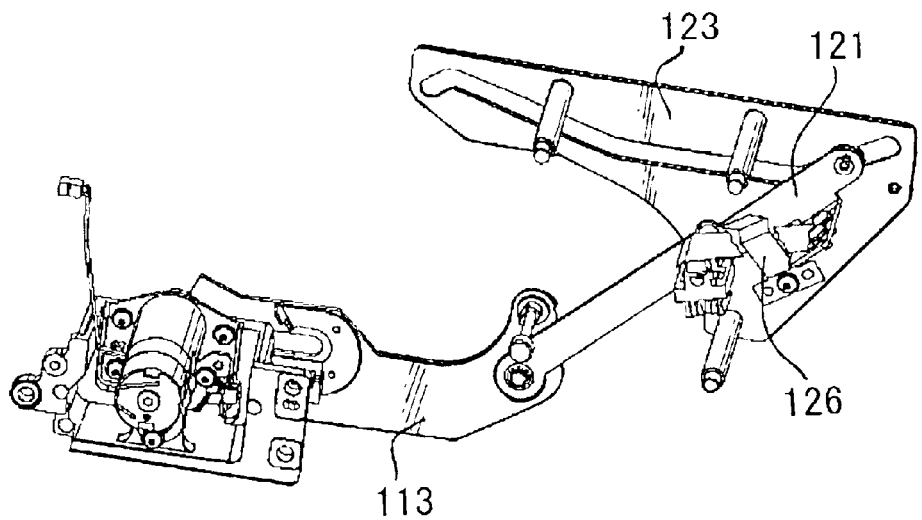
FIG. 15 is a lower perspective view showing the position of the brush arm in the state of the magnetic tape drive apparatus has conveyed a leader block by the threader of the magnetic tape drive apparatus according to the present invention.

Thereafter, when the thread motor 111 shown in FIG. 7 is driven and the drive arm 112 is rotated, the threader arm 113 is driven. Since the leader block has been hooked to the threader pin 116, as shown in FIG. 14, the threader arm 113 causes the magnetic tape to be pulled out. The magnetic tape is conveyed into the take-up reel 13. When a predetermined time period has elapsed after the photo sensor B120 has detected the flag 117 placed at the threader arm 113 shown in FIG. 7, the thread motor 111 stops. The pulling operation of the magnetic tape using the leader block is completed. The threading mechanism using the threader 11 was disclosed as Japanese Patent Publication No. 2001-184851. At that point, as shown in FIG. 15, the brush arm 121 is raised by the leaf spring 126. Thus, play between the parts that compose the head brush mechanism 12 is removed.

While the threader 11 is operating, the tape is tensioned by the cartridge reel motor 6 shown in FIG. 3 so as to prevent the magnetic tape from becoming loose and the leader block from dropping from the threader pin 116 shown in FIG. 7.

Figure 16:
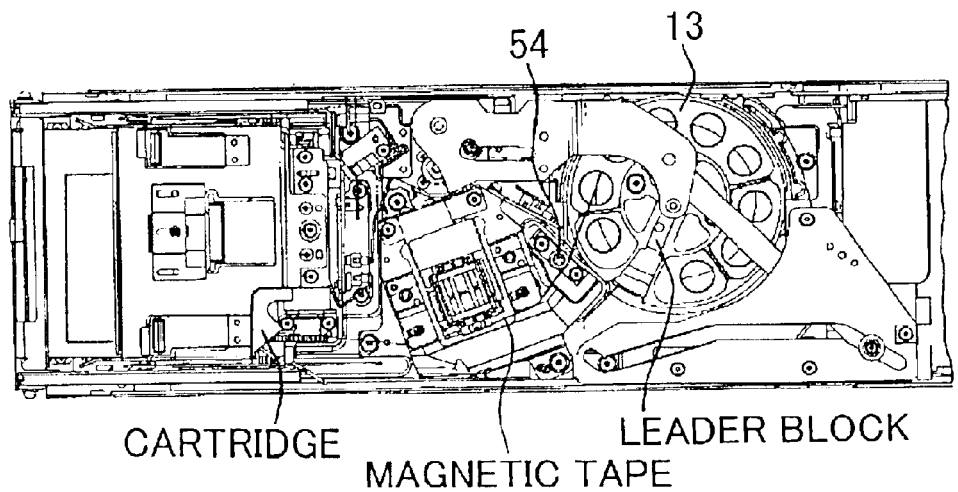
FIG. 16 is a top view showing the state of the magnetic tape drive apparatus is running a tape according to the present invention.

The magnetic tape pulled out by the threader 11 shown in FIG. 7 is wound around the take-up reel 13 by the take-up reel motor 14 as shown in FIG. 16. Data is read or written from/to the magnetic tape that is running. With an output signal from the tension transducer 54 on the head guide assembly 5, the tension of the tape is always controlled.

Figure 13:
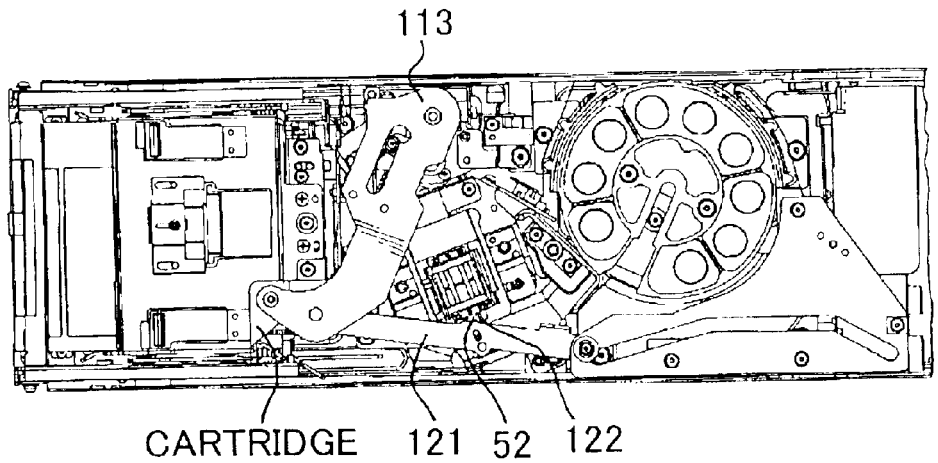
FIG. 13 is a top view showing the state of the magnetic tape drive apparatus has conveyed a cartridge or not unloaded a cartridge by the loader of the magnetic tape drive apparatus according to the present invention.

When the cartridge is unloaded, the magnetic tape is wound into the cartridge. In the state of the magnetic tape not wound around the take-up reel 13, the thread motor 111 shown in FIG. 7 is driven. As a result, the drive arm 112 is rotated and the threader arm 113 is driven until the leader block is contained into the cartridge. At that point, the tape is tensioned by the cartridge reel motor 6 shown in FIG. 3 so as to prevent the magnetic tape from loosing and the leader block from dropping from the threader pin 116 shown in FIG. 7. When a predetermined time period has elapsed after the photo sensor A173 shown in FIG. 14 has detected the flag 117 placed at the threader arm 113 shown in FIG. 7, the thread motor 111 stops. As a result, the conveying operation of the leader block is completed. As shown in FIG. 13, the brush 122 disposed on the brush arm 121 that travels corresponding to the leader block conveying operation of the threader arm 113 contacts the head assembly 52. In this state, the head can be cleaned. The head assembly 52 is moved upward and downward so as to clean the head. The head brush mechanism was disclosed as Japanese Patent Publication No. 2002-133618.

Figure 17:
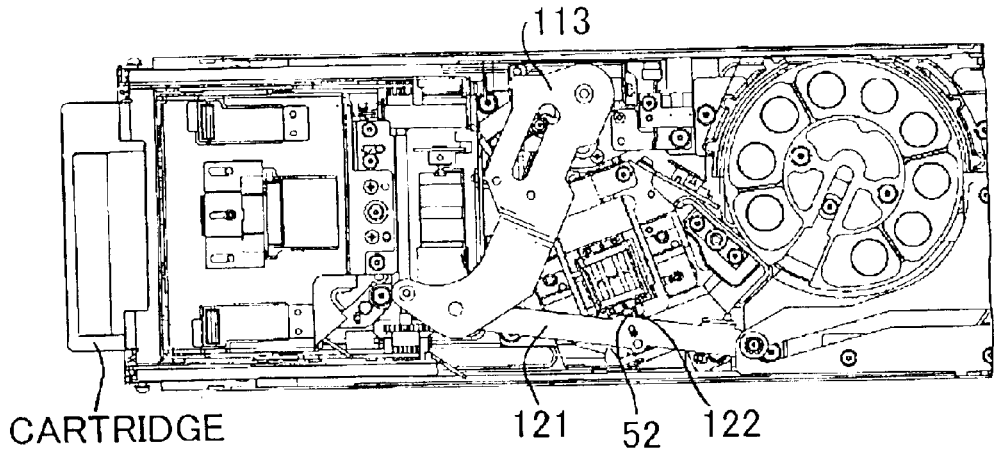
FIG. 17 is a top view showing the state of the magnetic tape drive apparatus has unloaded a cartridge by the loader or has loaded the cartridge manually or by a handling mechanism according to the present invention.

After the head has been cleaned, the loader motor 9 shown in FIG. 6 is rotated and the drive arm 87 shown in FIG. 5 is rotated. As a result, the loader cam plate 88 is traveled forward. With a cam mechanism, when the loader cam plate 88 is traveled, the loader tray 81 and the cartridge loaded thereto are conveyed together. When a predetermined time period has elapsed after the photo sensor 86 shown in FIG. 6 has detected the flag 85 placed on the loader tray 81 shown in FIG. 4, the loader motor 9 is stopped. As shown in FIG. 17, the cartridge is unloaded. Thereafter, the cartridge is took out from the drive apparatus manually or by the handling mechanism of the host unit.

Figure 18:
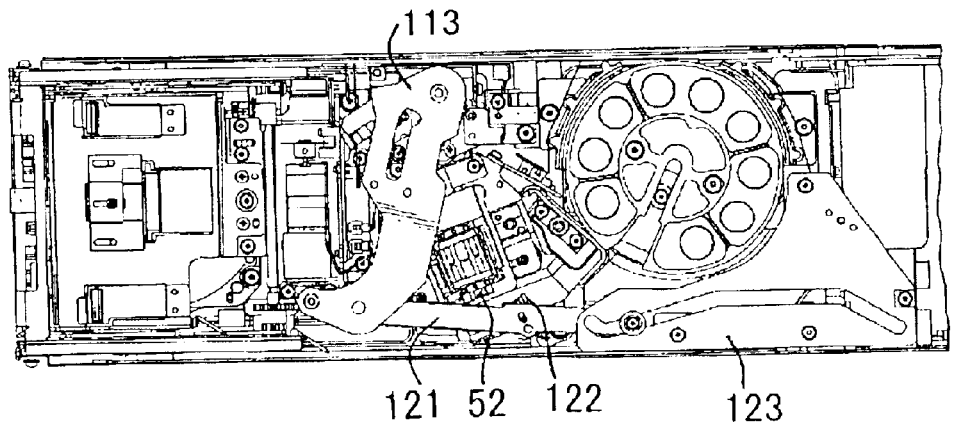
FIG. 18 is a top view showing a position of the threader in the state of the magnetic tape drive apparatus has not loaded a cartridge for a predetermined time period according to the present invention.

When a cartridge is not loaded thereto in a predetermined time period after a cartridge has been taken out from the drive apparatus, the thread motor 111 shown in FIG. 7 is rotated. As shown in FIG. 18, the threader arm 113 is slightly traveled toward the take-up reel 13. Corresponding to that, the brush 122 goes apart from the head assembly 52. In the state, when a cartridge is loaded to the loader 8, light emitted from the photo diode 171 shown in FIG. 6 is blocked by the cartridge. When the photo transistor 172 detects the presence of the cartridge, the thread motor 9 is rotated and the threader arm 113 is traveled toward the loader 8 as shown in FIG. 17. As a result, the threader arm 113 is placed at a position that allows the leader block placed at the edge of the magnetic tape enclosed in the cartridge that is being conveyed to be hooked to the threader pin 116 of the threader arm 113.

According to another embodiment of the present invention, the loader 8 can be driven by a converting mechanism composed of a gear and a rack shown in FIG. 19. The rotation of the loader motor 9 causes a loader cam plate 37 to which the rack is disposed through the gear to be traveled forward and backward. When the loader cam plate 37 is traveled, the loader tray 81 conveys the cartridge.

In the forgoing embodiments, the rubber buffering member 20 shown in FIG. 3 may be a resin buffering member or a vibration attenuating unit. The rubber elastic member 19 shown in FIGS. 12A and 12B may be a helical compression coil spring, a helical torsion coil spring, a helical tension coil spring, or a resin elastic member. The leaf spring 126 shown in FIG. 11 may be a helical compression coil spring, a helical torsion coil spring, a helical tension coil spring, a resin elastic member, or a rubber elastic member. In addition according to the forgoing embodiments, the brush arm 121 is raised by the leaf spring 126 shown in FIG. 11. However, according to the present invention, the brush arm 121 may be lowered by the leaf spring 126.

As was described above, according to the present invention, in a loader mechanism, a motor that drives a loader is disposed in the rear of the loader. As a result, the width of the drive can be decreased. Thus, the size of the drive can match the 5-inch form factor size. In addition, when a magnetic tape is pulled out from a cartridge by a threader mechanism, a threader arm of the threader mechanism is moved in a simple circle. As a result, the mechanism becomes simple and the size of the drive becomes small. In addition, since the mechanism becomes simple, the number of parts can be decreased and the cost of the apparatus can be reduced.

With a rubber elastic member or a leaf spring, play between moving parts such as a loader tray that convey a cartridge or a head bush mechanism is removed. As a result, the apparatus can withstand a vibration while a magnetic tape is running.

Although the present invention has been shown and described with respect to preferred embodiments thereof, it should be understood by those skilled in the art that the foregoing and various other changes, omissions, and additions in the form and detail thereof may be made therein without departing from the spirit and scope of the present invention.

What is claimed is:

1. A magnetic tape drive apparatus which magnetically records and reproduces data using a tape cartridge which encloses a magnetic tape, comprising:

a loader which conveys a loaded tape cartridge and mounts the tape cartridge in a state of the magnetic tape being able to be pulled out;

a loader motor which drives the loader;

a threader which pulls out a leader block placed at an edge portion of the magnetic tape from the mounted cartridge and conveys the leader block; and a head brush mechanism which functions corresponding to the leader block conveyed by said threader, wherein the loader motor is disposed at a rear side of said loader opposite a tape cartridge loading side of said loader;

wherein said head brush mechanism includes mechanical parts, wherein the mechanical parts include an elastic member or a spring, and wherein the elastic member or spring prevents said head brush mechanism from vibrating.

2. The magnetic tape drive apparatus as set forth in claim 1, wherein said loader has a motion converting mechanism which converts a rotating motion of the loader motor into a forward and backward motion of a loader tray and conveys the tape cartridge.

3. The magnetic tape drive apparatus as set forth in claim 1, wherein said threader has one threader arm which circles about its fulcrum.

4. The magnetic tape drive apparatus as set forth in claim 1, wherein an aperture size of a tape cartridge loading side matches a five-inch form factor size.

5. The magnetic tape drive apparatus as set forth in claim 1, wherein said head brush mechanism is connected to said threader.

6. A magnetic tape drive apparatus which magnetically records and reproduces data using a tape cartridge which encloses a magnetic tape, comprising:

a loader which conveys a loaded tape cartridge and mounts the tape cartridge in a state of the magnetic tape being able to be pulled out;

a loader motor which drives the loader;

a threader which pulls out a leader block placed at an edge portion of the magnetic tape from the mounted cartridge and conveys the leader block; and a head brush mechanism which functions corresponding to the leader block conveyed by said threader, wherein the loader motor is disposed at a rear side of said loader opposite a tape cartridge loading side of said loader;

further comprising an elastic member or a spring disposed on a deck base, wherein said loader includes mechanical parts, wherein the elastic member or the spring contacts a loader tray at a mount position of the tape cartridge, and wherein the elastic member or spring prevents the mechanical parts from vibrating.

* * * * *